United States Patent
Wang

(10) Patent No.: US 11,726,614 B2
(45) Date of Patent: Aug. 15, 2023

(54) METHOD FOR OBTAINING TOUCH DATA, TOUCH MODULE AND ELECTRONIC DEVICE

(71) Applicant: BEIJING XIAOMI MOBILE SOFTWARE CO., LTD., Beijing (CN)

(72) Inventor: Yue Wang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 17/562,118

(22) Filed: Dec. 27, 2021

(65) Prior Publication Data
US 2022/0382408 A1    Dec. 1, 2022

(30) Foreign Application Priority Data
May 27, 2021    (CN) .......................... 202110606787.6

(51) Int. Cl.
*G06F 3/041*    (2006.01)
*G06F 3/044*    (2006.01)

(52) U.S. Cl.
CPC .......... *G06F 3/0418* (2013.01); *G06F 3/0412* (2013.01); *G06F 3/0446* (2019.05)

(58) Field of Classification Search
CPC ..... G06F 3/0418; G06F 3/0412; G06F 3/0446
See application file for complete search history.

(56) References Cited

U.S. PATENT DOCUMENTS

| | | | |
|---|---|---|---|
| 2011/0057890 A1* | 3/2011 | Goo ..................... | G06F 3/04182 345/173 |
| 2011/0193817 A1 | 8/2011 | Byun et al. | |
| 2012/0287077 A1* | 11/2012 | Pant ...................... | G06F 3/0418 345/174 |
| 2013/0321325 A1* | 12/2013 | Jo .......................... | G06F 3/0446 345/174 |
| 2014/0176489 A1* | 6/2014 | Park ..................... | G06F 3/04166 345/174 |
| 2017/0075472 A1* | 3/2017 | Min ....................... | G06F 3/0445 |
| 2018/0329573 A1 | 11/2018 | Liu et al. | |
| 2020/0301539 A1* | 9/2020 | Lee ..................... | G06F 3/04182 |
| 2021/0397327 A1* | 12/2021 | Lee .......................... | G09G 3/20 |
| 2022/0244812 A1* | 8/2022 | Park .................... | G06F 3/04186 |

OTHER PUBLICATIONS

European Patent Application No. 21217885.9, Search and Opinion dated Jun. 27, 2022, 11 pages.

\* cited by examiner

*Primary Examiner* — Hong Zhou
(74) *Attorney, Agent, or Firm* — Cozen O'Connor

(57) ABSTRACT

A touch module includes: an integrating circuit for converting a current signal in each touch detection line at a touch position into a touch signal, in which the touch signal includes a noise signal; a compensation circuit for storing the touch signal and compensating the noise signal in the touch signal to obtain a compensated; the analog-to-digital converter for performing analog-to-digital conversion on the compensated signal to obtain touch data.

16 Claims, 6 Drawing Sheets

METHOD FOR OBTAINING TOUCH DATA, TOUCH MODULE AND ELECTRONIC DEVICE

CROSS REFERENCE TO RELATED APPLICATIONS

This application claims priority to Chinese Patent Application No. 202110606787.6, filed on May 27, 2021, the content of which is incorporated herein by reference in its entirety.

TECHNICAL FIELD

The disclosure relates to the field of touch technologies.

BACKGROUND

With the development of full-screen displays, devices such as cameras need to be installed under the display, and the structure of the display needs to be modified.

SUMMARY

According to a first aspect of the disclosure, a touch module includes: an integrating circuit, a first switch, and an analog-to-digital converter. The integrating circuit is connected to a touch detection line. The first switch is connected to the integrating circuit, the analog-to-digital converter and the compensation circuit, respectively. The integrating circuit is configured to convert a current signal in each touch detection line at a touch position into a touch signal, in which the touch signal includes a noise signal. The compensation circuit is configured to store the touch signal and compensate the noise signal in the touch signal to obtain a compensated signal. The analog-to-digital converter is configured to perform analog-to-digital conversion on the compensated signal to obtain touch data.

According to a second aspect of the disclosure, an electronic device includes a display screen, a processor and a touch module. The processor is respectively connected to the display screen and the touch module. The processor is configured to determine at least one target touch detection line based on an image to be displayed on the display screen. The touch module is configured to obtain touch data based on an electrical signal on at least one target touch detection line. The processor is further configured to determine a touch position based on the touch data, and determine display content corresponding to the touch position.

According to a third aspect of embodiments of the disclosure, a method for obtaining touch data is provided. The method includes: in response to detecting a scan signal, switching to a first working state and obtaining a touch signal, in which the touch signal includes a noise signal; in response to obtaining the touch signal, switching to a second working state, compensating the noise signal in the touch signal based on an electrical signal on at least one target touch detection line and obtaining a compensated signal; and in response to obtaining the compensated signal, switching to a third working state and performing analog-to-digital conversion on the compensated signal to obtain touch data.

It should be understood that, the above general description and the following detailed description are only exemplary and explanatory, and cannot limit the disclosure.

BRIEF DESCRIPTION OF THE DRAWINGS

The drawings herein are incorporated into the specification and constitute a part of the specification, show embodiments in conformity with embodiments of the disclosure, and explain the principle of the disclosure together with the specification.

DETAILED DESCRIPTION

The embodiments will be described in detail here, examples of which are shown in the accompanying drawings. When the following descriptions refer to the accompanying drawings, unless otherwise indicated, the same numbers in different drawings represent the same or similar elements. The examples described in the following example embodiments do not represent all the examples consistent with the disclosure. Rather, they are merely examples of the apparatuses and methods consistent with some aspects of the disclosure as recited in the appended claims.

Figure 1:
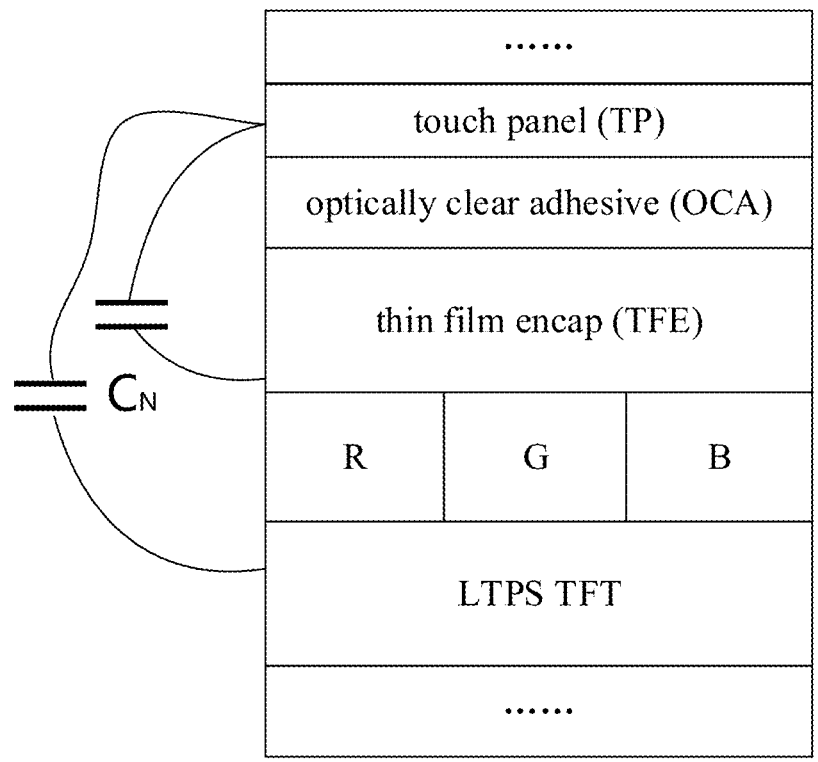
FIG. 1 is a structural block diagram of an OLED display screen illustrated in the related art.
Figure 2:
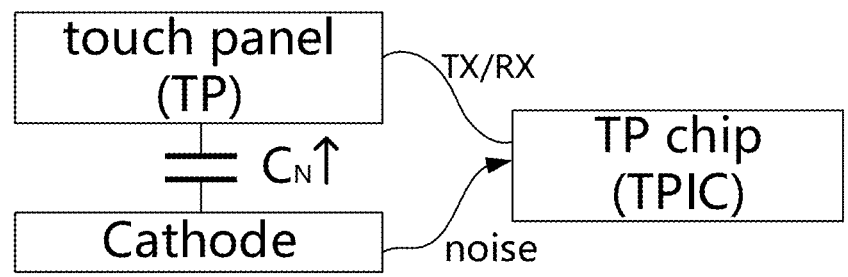
FIG. 2 is a schematic diagram of an equivalent circuit of the OLED display screen in FIG. 1 illustrated in the related art.

In the related art, in order to improve visual effect differences between an area with an under-screen camera and an ordinary area in a mobile phone installed with the under-screen camera, some special designs may be made for the screen, including thinning the thickness of thin film encap (TFE) on a light-emitting layer. Referring to FIG. 1, when the TFE becomes thin, a distance between a touch panel and the light-emitting layer (indicated by RGB) is reduced. In view of the capacitance C is inversely proportional to the distance D based on the equation of $C=\varepsilon*\varepsilon 0*S/d$, the parasitic capacitance between touch lines in the touch panel and electrodes (such as, a cathode) in the light-emitting layer is caused to be increased. As shown in FIG. 2, the consequent consequences include that the noise of the touch increases, a signal-to-noise ratio of a touch signal reduces, and even the touch fails.

At present, OLED mobile phones adopt mutual capacitive touch mode. The capacitance is generated between a TX line and a RX line. The finger touch leads to a capacitance change which is able to reflect finger touch information. The TX and RX lines are in a grid. One or more TX lines are formed of one group, which is scanned line by line. At the same time, only one group of TX lines is in touch detection state.

The parasitic capacitance Cm between the TX and RX lines changes during the finger touch to generate the current I, and the current I is converted to Vout after $I_{gain}$ amplification. In the related art, the Vout is directly input to the ADC module in the touch chip for final analog-to-digital conversion and other processing. Due to the existence of Cm, there is a lot of noises in Vout, which cannot reflect the real touch. In the embodiments of this disclosure, a feedback module is added as shown in a shadow area of FIG. 3 to solve the above problem. The specific working process of the compensation circuit F will be described in the following embodiments.

Figure 3:
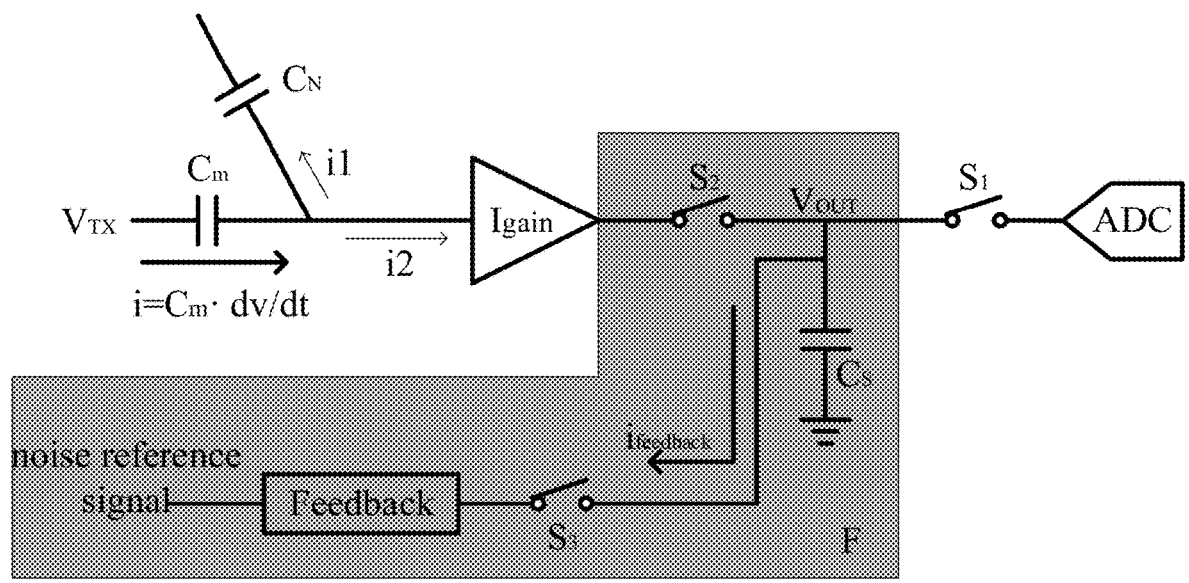
FIG. 3 is a schematic diagram illustrating a touch module according to an example embodiment.
Figure 4:
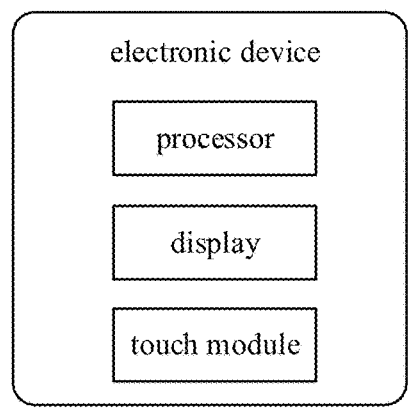
FIG. 4 is a block diagram illustrating an electronic device according to an example embodiment.

In order to solve the above technical problems, the embodiments of the disclosure provide a method and an apparatus for obtaining touch data, a touch module and an electronic device. FIG. 3 is a block diagram illustrating a touch module according to an example embodiment. FIG. 4 is a block diagram illustrating an electronic device according to an example embodiment.

Referring to FIG. 3, a touch module includes an integrating circuit $I_{gain}$, a first switch $S_1$, an analog-to-digital converter ADC, and a compensation circuit F, in which the circuit $I_{gain}$ is connected to the touch detection line, the $S_1$ is connected to the circuit $I_{gain}$, the ADC, and the circuit F, respectively. The circuit $I_{gain}$ is used to convert a current signal in each touch detection line at the touch position into a touch signal, in which the touch signal includes a noise signal. The circuit F is used to store the touch signal and compensate the noise signal in the touch signal to obtain a compensated signal. The ADC is used to perform analog-to-digital conversion on the compensated signal to obtain touch data.

It should be noted that, the compensated signal may refer to a signal in which the noise signal is reduced or a signal in which the noise signal is cancelled (i.e., without the noise signal).

It should be noted that in this embodiment, the current corresponding to the touch signal is calculated by i=Cm*dV/dt, where dV represents a voltage variation at both ends of the capacitor Cm.

It should be noted that in practical applications, when the display screen is not triggered, the touch module also uses the above process to obtain the touch signal. At this time, the touch signal can be regarded as 0, and the finally obtained touch data is also 0, that is, indicating that no trigger operation is detected. That is to say, the above-mentioned touch module can work reliably when the display screen is triggered or not. The situation is only described in this embodiment, where the display screen is in the triggered operation scenario.

In this embodiment, the integrating circuit is implemented by an integrator including an operational amplifier and an integration capacitor. The skilled in the art can select a suitable circuit scheme according to a specific scenario, and the corresponding scheme falls within the protection scope of the disclosure.

In this embodiment, continuing to refer to FIG. 3, the compensation circuit may include a second switch $S_2$, a third switch $S_3$, a storage capacitor $C_S$, and a feedback module Feedback. A first end of the second switch $S_2$ is connected to $I_{gain}$, and a second end of $S_2$ is respectively connected to a first end of $S_1$, a first pole of $C_S$, and a first end of $S_3$. A second end of $C_S$ is grounded. A first end of $S_3$ is connected to the first end of $C_S$, and the second end of $S_3$ is connected to the first end of Feedback.

In an example, the first switch $S_1$, the second switch $S_2$, and the third switch $S_3$ may be implemented by switching devices such as a transistor or a MOS tube. The Feedback includes a processing circuit with logic operations or calculation functions, and a current source that can control an output current. The processor can send control signals to the switches $S_1 \sim S_3$ for turning off or on the switches, and control the current source to output a feedback current $i_{feedback}$ with a designated magnitude.

It should be noted that, assuming that a current corresponding to the parasitic capacitance $C_N$ in the related art is $i_0$, a current variation of the parasitic capacitance $C_N$ is $i_1-i_0$ compared with the solution in the related art, in which the current variation is the subsequent occurred noise signal. Theoretically, when a capacitance value of the parasitic capacitance $C_N$ is equal to that of the storage capacitor $C_S$, $i_{feedback}=i_1-i_0$. However, in practical applications, since the capacitance value of the parasitic capacitance $C_N$ is not easy to determine, it is determined in the disclosure that there is a mapping relationship between $i_{feedback}$ and $i_1-i_0$, rather than an equivalence relationship. Based on the above mapping relationship, it can be known that when the feedback current $i_{feedback}$ is obtained, the above current $i_1-i_0$ can be compensated.

In this embodiment, when different images are displayed in the display screen, the parasitic capacitance $C_N$ introduces different magnitudes of noise signals due to the voltage changes on the electrodes, so the noise signals are needed to be eliminated. It may be understood that, when the images displayed at two touch detection lines match (that is, the same or similar) with each other, the parasitic capacitances corresponding to the two touch detection lines introduce the same noise signal. Based on the foregoing principle, the embodiment can obtain the correspondence between noise reference signals and feedback currents.

Figure 10:
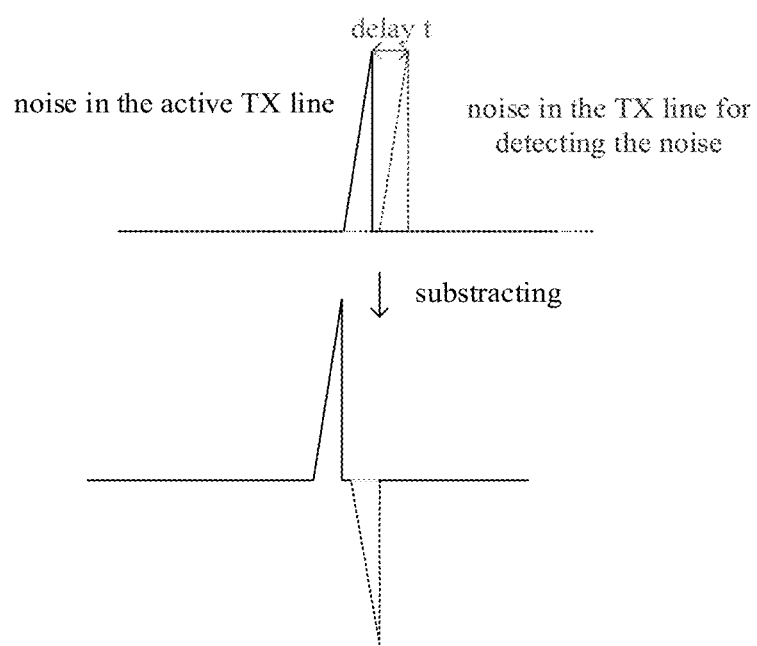
FIG. 10 is schematic diagram illustrating a noise dislocation after voltage waveform subtraction due to delay according to an example embodiment.

With the above circuit architecture, $C_S$ is used to store a signal first, rather than to directly subtract a Vout waveform output by the active TX line from a Vout waveform output by a TX line for detecting the noise. As shown in FIG. 10, since there may be some delay in the actual noise compensation, a noise dislocation may occur after voltage waveform subtraction if there is a noise peak, and the noise compensation may be no longer accurate. This noise dislocation phenomenon may be avoided by storing the signal charges with a capacitor. Since the picture displayed on the screen will affect actual parasitic capacitance parameters, the TX lines with similar display content can be selected as TX lines for noise detection according to the display content of the screen, so as to obtain more accurate noise data. The feedback module in the disclosure determines the noise signal based on the TX lines with similar display content.

In an embodiment, the touch panel chip (TPIC) sends picture information to the display panel, in which each sub-pixel may have a piece of information (e.g., a voltage value or a PWM duty cycle). Two pieces of pixel information between two rows where respective TX lines are located in the TPIC are compared. In response to their difference being less than a set threshold (which is determined in combination with the actual panel design), it can be determined that the display contents of two TX lines are similar.

In an embodiment, other inactive TX lines can be used to detect the noise in real time, and the detected noise can be subtracted from the active TX lines, so as to improve the signal-to-noise ratio and detection accuracy.

Taking a noise reference signal being a voltage signal on a target touch detection line as an example, when a specified image is displayed at the target touch detection line, the pixel data of the specified image is set as 0, a voltage signal 0 can be read from the ADC, different feedback currents $i_{feedback}$ are used to compensate the noise signal and signal-to-noise ratios of the touch module are obtained. The feedback current with the largest signal-to-noise ratio is used as the feedback current $i_{feedback}0$ of this test. When the pixel data of the specified image is set as 1, a voltage signal 1 is read, a feedback current $i_{feedback}1$ is obtained in the above-mentioned manner, and so on, until the pixel data of the specified image is set as 255, the voltage signal 0 is read and a feedback current $i_{feedback}255$ is obtained. Then, fitting is performed according to the above voltages 0~255 and the feedback currents $i_{feedback}0$~255, so as to obtain a correspondence between noise reference signals and feedback currents. Based on the above method, the correspondence between reference currents and feedback currents can be established. Based on a correspondence between pixel data and feedback currents, selection can be made according to specific scenarios, and the corresponding solution falls within the protection scope of the disclosure.

In the embodiment, taking acquisition of touch data on a touch detection line as an example, the working process of the compensation circuit F includes the following working states.

The first working state, signal storage: when the second switch $S_1$ is on and the first switch $S_2$ and the third switch $S_3$ are off, the storage capacitor $C_S$ is charged which includes both the required touch signal charges and charges generated from the parasitic capacitance Cm, the storage capacitor $C_S$ stores the touch signal. That is, when the user touches the display screen, a current is generated since the capacitance (i.e., $C_m$) at an overlap of the touch detection line TX and the touch detection line RX changes. The above integrating circuit integrates the current to obtain the touch signal. The touch signal is stored in a way that the storage capacitor $C_S$ stores charges.

The second working state, noise filtration: when the third switch $S_3$ is on and the first switch $S_1$ and the second switch $S_2$ are off, the feedback module Feedback outputs $i_{feedback}$ to filter out the noise signal, and the storage capacitor $C_S$ stores the filtered signal at this time. At the second working state, the Feedback determines a current $i_{feedback}$ and extracts the excess noise charges on $C_S$ according to the noise signal detected by other inactive TX lines. At this time, the $C_S$ only includes normal touch signal charges.

The third working state, signal outputting: when the first switch $S_2$ is on and the second switch $S_1$ and the third switch $S_3$ are off, the storage capacitor $C_S$ outputs a compensated signal. At the third working state, the touch signal charges in the storage capacitor $C_S$ are transferred to the subsequent AD circuit and processed to obtain final touch information.

It should be noted that, considering that the touch module may be used in an electronic device, the subsequent embodiments may take the electronic device as an example to describe the solutions of each embodiment. During this period, the structure and working process of the touch module may be described as well as collaborative work processes between the touch module and other devices, which may not be explained here.

So far, in the solutions according to the embodiments of the disclosure, a compensation circuit can be provided in the touch module, the touch signal is stored in the compensation circuit, the noise signal in the touch signal is compensated to filter out the above noise signal, a compensated signal is obtained, and the analog-to-digital converter performs analog-to-digital conversion on the compensated signal to obtain touch data. In this way, the embodiment adopts a method of storing first, compensating and finally outputting, which can accurately filter out noise signals and obtain accurate touch signals, be beneficial to improve the signal-to-noise ratio of touch signals, and ensure effective touch, that is, achieving the effect that the noise signals caused by the increase of the parasitic capacitance are filtered out.

FIG. 4 is a block diagram illustrating an electronic device according to an example embodiment. The electronic device may be a smart phone, a tablet computer, or the like. To simplify the drawings, only components related to this embodiment are shown in FIG. 4. Referring to FIG. 4, an electronic device includes a processor, a display screen, and a touch module. The processor is respectively connected to the display screen and the touch module. The processor is configured to determine at least one target touch detection line based on an image to be displayed on the display screen, and output a serial number of the at least one target touch detection line to the touch module. The touch module is configured to obtain touch data based on a voltage signal on at least one target touch detection line. The processor is also configured to determine a touch position based on the touch data and determine display content corresponding to the touch position.

In the solutions according to the embodiments of the disclosure, a compensation circuit can be provided in the touch module, the touch signal is stored in the compensation circuit, the noise signal in the touch signal is compensated to filter out the above noise signal, a compensated signal is obtained, and the analog-to-digital converter performs analog-to-digital conversion on the compensated signal to obtain touch data. In this way, the embodiment may accurately filter out noise signals and obtain accurate touch signals, which is beneficial to improve the signal-to-noise ratio of touch signals, and ensures effective touch, that is, achieving the effect that the noise signals caused by the increase of the parasitic capacitance are filtered out.

Figure 5:
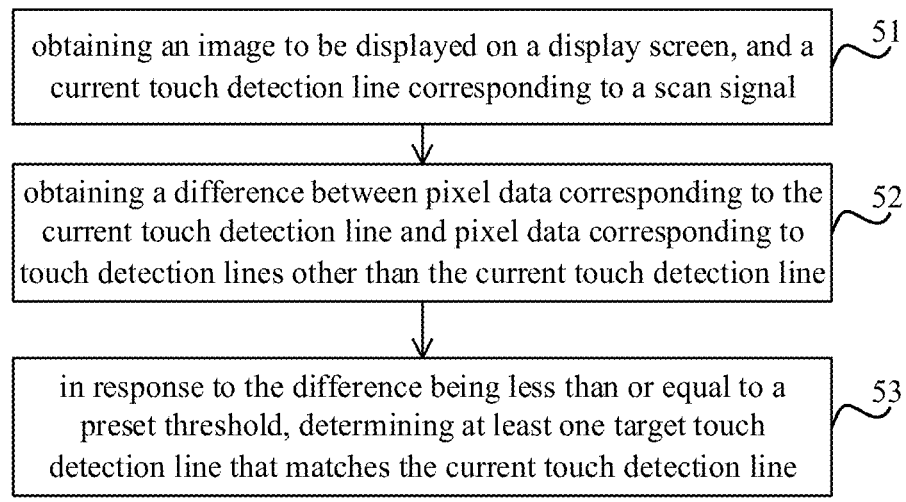
FIG. 5 is a flowchart for obtaining a target touch detection line according to an example embodiment.

In this embodiment, referring to FIG. 5, the processor may determine the target touch detection line according to the image to be displayed, which may include the following steps At 51, the processor may obtain an image to be displayed on the display screen and a current touch detection line corresponding to a scan signal. Since the touch chip may output a scan signal to each touch detection line (such as TX) according to a preset cycle at the touch stage. Through the scan signal, a level on the touch detection line (RX) can be adjusted to a preset level VTX. For convenience of description, the touch detection line corresponding to the scan signal for each time is considered as the current touch detection line, and all the detection lines other than the current touch detection line are considered as other touch detection lines.

At 52, the processor may obtain a difference between pixel data corresponding to the current touch detection line and pixel data corresponding to other touch detection lines. Since each touch detection line corresponds to a row of pixel data/a column of pixel data (the following takes scanning in row for description), the corresponding row of pixel data can be used as the pixel data corresponding to the touch detection line, so that the processor can obtain pixel data corresponding to each row of touch detection line. Then, the processor can obtain the difference between the pixel data of the current touch detection line and the pixel data of the touch detection line at any other row. If the difference is less than or equal to the preset threshold, the corresponding display content matches. If the difference is greater than the preset threshold, the corresponding display content does not match (i.e., different). The above preset threshold can be set according to specific scenarios. For example, a range of the image displayed on the display screen is large, and the above preset threshold can be large. If the range of the image displayed is small, the above preset threshold can be small. The corresponding solution falls into the protection scope of the disclosure. In an example, the value range of the above preset threshold is within 12 to 26 gray levels, or a ratio range of 5% to 10%.

At 53, when the difference is less than or equal to a preset threshold, the processor may determine that at least one target touch detection line that matches the current touch detection line is obtained. It may be understood that a number of target touch detection lines can be selected according to specific scenarios, such as one or more.

In the embodiment, by determining the target touch detection line, the noise signal of the touch detection line being not triggered can be determined as the subsequent noise reference signal, i.e., the noise signal caused only by the increase of the parasitic capacitance, which is beneficial to subsequently compensate the noise signal in the touch signal.

Figure 6:
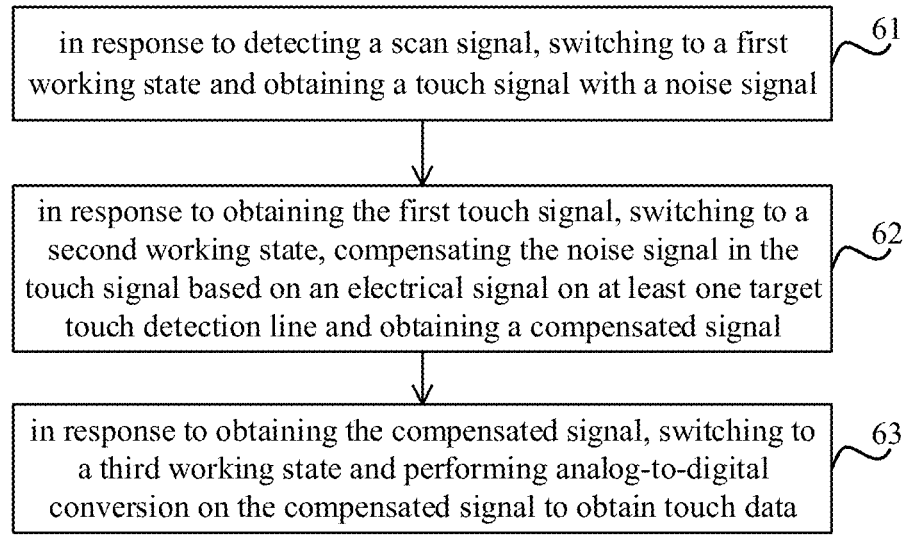
FIG. 6 is a flowchart illustrating a method for obtaining touch data according to an example embodiment.

Continuing to refer to FIG. 3, the touch module can obtain touch data based on the electrical signal on at least one target touch detection line, which include the following steps shown in FIG. 6.

At 61, in response to detecting a scan signal, it switches to a first working state, and a touch signal is obtained, in which the touch signal includes a noise signal.

At 62, after obtaining the touch signal, it switches to a second working state, the noise signal in the touch signal is compensated based on an electrical signal on at least one target touch detection line, and a compensated signal is obtained.

Figure 7:
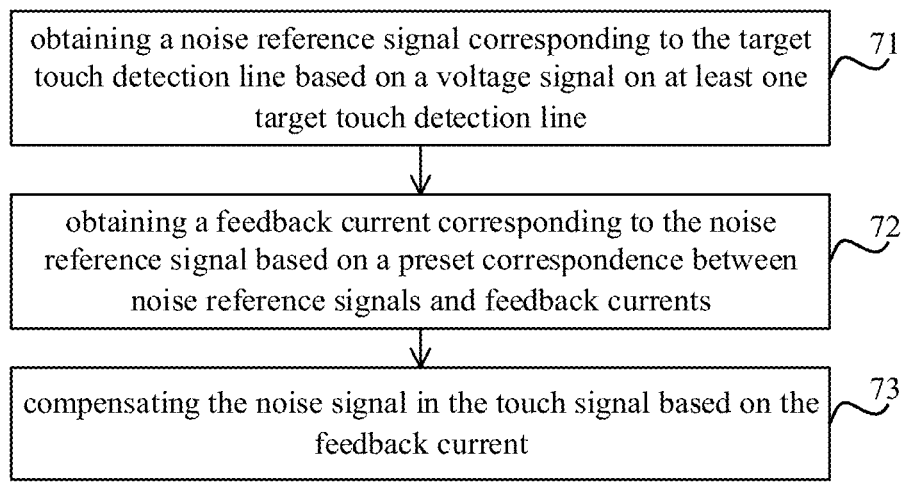
FIG. 7 is a flowchart illustrating a method for obtaining touch data according to an example embodiment.

At 63, after obtaining the compensated signal, it switches to a third working state and analog-to-digital conversion is performed on the compensated signal to obtain touch data. The step at 62 about the touch module compensating the noise signal further includes the following steps shown in FIG. 7.

At 71, the feedback module Feedback in the touch module may obtain a noise reference signal corresponding to the target touch detection line based on a voltage signal on at least one target touch detection line. For example, when the number of target touch detection lines is 1, a voltage signal on the target touch detection line can be obtained. The obtaining process may refer to the first working state or the third working state in the embodiment shown in FIG. 3. The difference lies in the voltage signal shown in FIG. 3 is a voltage on the touch detection line at the touch position but the voltage signal at 71 is a voltage on the touch detection line outside the touch position and displaying the same content. Then, the touch module can obtain the voltage signal on the target touch detection line as a noise reference signal corresponding to the target touch detection line.

In order to improve the accuracy of determining the noise, it is also possible to collect multiple signals of the TX lines with similar display content, process the collected signals through an algorithm, for example, calculating an average value, and take the processed signal as the noise signal. For another example, when the number of target touch detection lines is multiple (more than 1), the touch module can obtain the average value of voltage signals of the multiple target touch detection lines, and determine the average value as the noise reference signal corresponding to the target touch detection line.

At 72, the touch module can obtain a feedback current $i_{feedback}$ corresponding to the noise reference signal based on a preset correspondence between noise reference signals and feedback currents. The correspondence between noise reference signals and feedback currents is stored in the touch module, and the feedback current can be queried based on the noise reference signal corresponding to the target touch detection line and the correspondence.

At 73, the noise signal in the touch signal is compensated based on the feedback current. The feedback module Feedback can adjust a current of the current source to the above feedback current $i_{feedback}$. When the third switch $S_3$ is on, the charges in the storage capacitor can be drawn out. Assuming that the closing time t3 of the third switch $S_3$ and the closing time t1 of the first switch $S_1$ are both known, then the storage capacitor releases the electric quantity $Q=i_{feedback}*t3$, so that the electric charges corresponding to the noise signal can be extracted. That is to say, at 72, the capacitance change of the storage capacitor is the same as the noise reference signal by extracting the above electric quantity Q from the storage capacitor $C_S$, so as to achieve the effect of compensating the noise signal.

So far, the embodiment adopts a method of storing first, compensating and finally outputting, instead of directly subtracting the Vout waveform output by the active TX line from a Vout waveform output by the TX line for detecting the noise, which can avoid the noise dislocation after voltage waveform subtraction, achieve the purpose of obtaining accurate touch signals, and help improve the signal-to-noise ratio of touch signals and ensure effective touch, that is, achieving the effect that the noise signals caused by the increase of the parasitic capacitance are filtered out.

On the basis of the foregoing embodiments, the embodiments of the disclosure also provide a method for obtaining touch data, including: in response to detecting a scan signal, switching to a first working state and obtaining a touch signal, in which the touch signal includes a noise signal; after obtaining the touch signal, switching to a second working state, compensating the noise signal in the touch signal based on an electrical signal on at least one target touch detection line and obtaining a compensated signal; and after obtaining the compensated h signal, switching to a third working state and performing analog-to-digital conversion on the compensated signal to obtain touch data.

In an embodiment, compensating the noise signal in the touch signal based on the electrical signal on at least one target touch detection line includes: obtaining a noise reference signal corresponding to the target touch detection line based on the electrical signal on at least one target touch detection line; obtaining a feedback current corresponding to the noise reference signal based on a preset correspondence between noise reference signals and feedback currents; and compensating the noise signal in the touch signal based on the feedback current.

In an embodiment, obtaining the noise reference signal corresponding to the target touch detection line based on the electrical signal on at least one target touch detection line includes: when a number of target touch detection lines is 1, obtaining the electrical signal on the target touch detection line, and determining the electrical signal as the noise reference signal corresponding to the target touch detection line; or when a number of target touch detection lines is multiple, obtaining an average value of the electrical signals of the multiple target touch detection lines, and determining the average value as the noise reference signal corresponding to the target touch detection line.

In an embodiment, the method further includes obtaining at least one target touch detection line, which specifically includes: obtaining an image to be displayed on the display screen, and a current touch detection line corresponding to a scan signal; obtaining a difference between pixel data corresponding to the current touch detection line and pixel data corresponding to other touch detection lines; and in response to the difference being less than or equal to a preset threshold, obtaining at least one target touch detection line that matches the current touch detection line.

It may be understood that the method according to the embodiment of the disclosure corresponds to the working process of the above-mentioned embodiment shown in FIG. 3 and FIG. 4, and the specific content may refer to the above embodiments, which may not be repeated herein.

Figure 8:
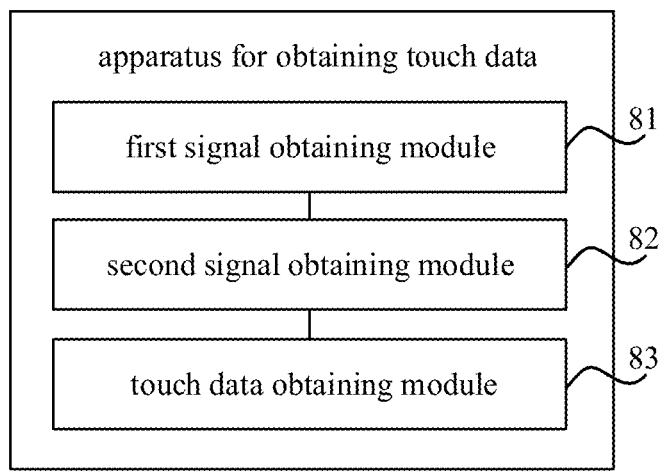
FIG. 8 is a block diagram illustrating an apparatus for obtaining touch data according to an example embodiment.

Based on the above embodiments, the embodiment of the disclosure also provides an apparatus for obtaining touch data, applicable to an electronic device with reference to FIG. 8.

The apparatus includes a first signal obtaining module 81, a second signal obtaining module 82 and a touch data obtaining module 83. The first signal obtaining module is configured to in response to detecting a scan signal, switch to a first working state and obtain a touch signal, in which the touch signal includes a noise signal. The second signal obtaining module is configured to after obtaining the touch signal, switch to a second working state, compensate the noise signal in the touch signal based on an electrical signal on at least one target touch detection line and obtain a compensated signal. The touch data obtaining module is configured to after obtaining the compensated signal, switch to a third working state and perform analog-to-digital conversion on the compensated signal to obtain touch data.

It may be understood that, the apparatus according to the embodiment of the disclosure corresponds to the above method embodiments, and the specific content may refer to the above embodiments, which may not be repeated herein.

Figure 9:
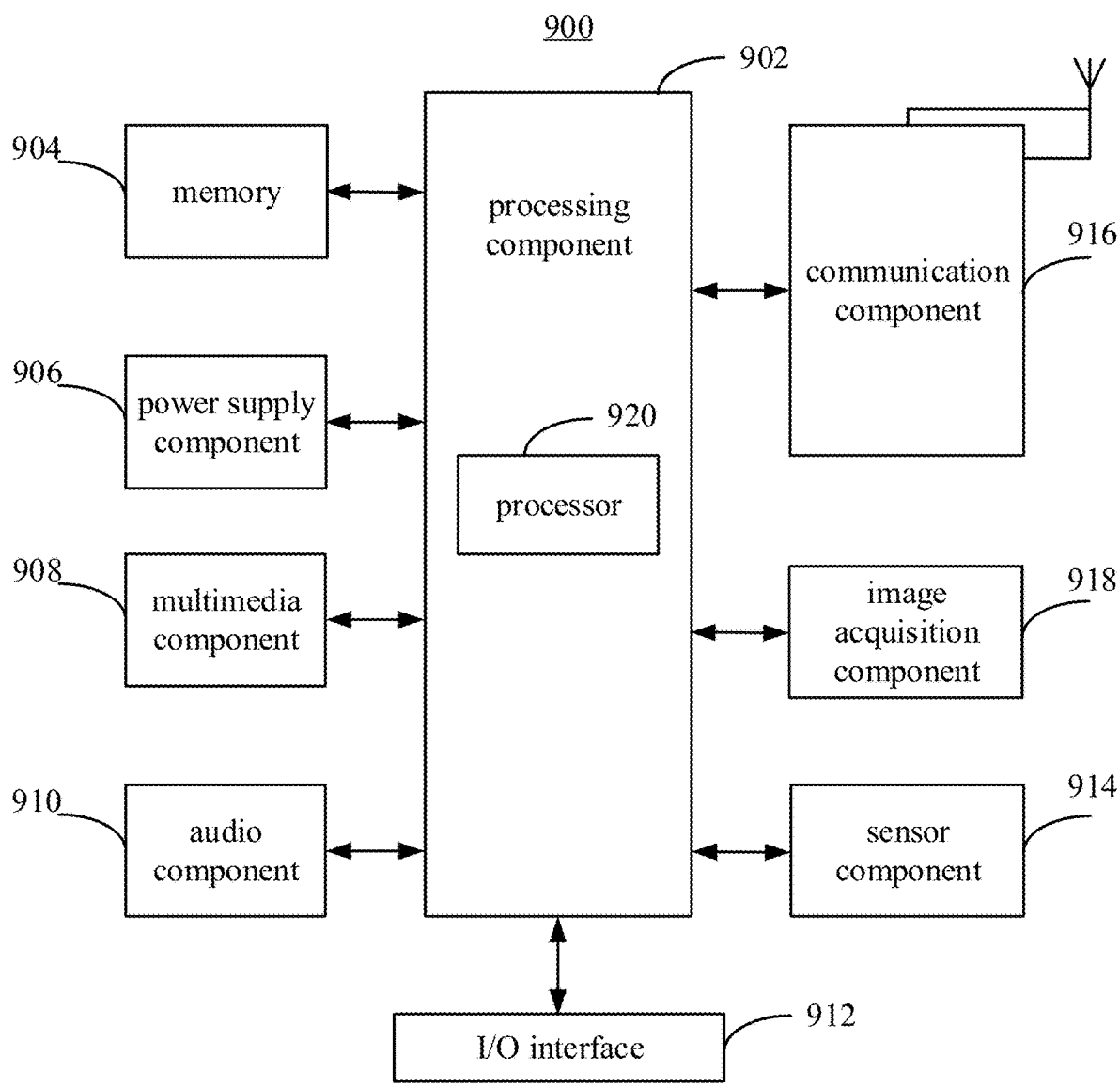
FIG. 9 is a block diagram illustrating an electronic device according to an example embodiment.

FIG. 9 is a block diagram of an electronic device according to an example embodiment. For example, the electronic device 900 may be a smart phone, a computer, a digital broadcasting terminal, a tablet device, a medical device, a fitness device, a personal digital assistant, and so on.

Referring to FIG. 9, the electronic device 900 may include one or more of the following components: a processing component 902, a memory 904, a power supply component 906, a multimedia component 908, an audio component 910, an input/output (I/O) interface 912, and a sensor component 914, a communication component 916, and an image acquisition component 918.

The processing component 902 generally controls the whole operation of the electronic device 900, such as the operations related to displays, phone calls, data communication, camera operations and recording operations. The processing component 902 may include one or more processors 920 to perform computer programs. In addition, the processing component 902 may include one or more modules for the convenience of interactions between the processing component 902 and other components. For example, the processing component 902 may include a multimedia module for the convenience of interactions between the multimedia component 908 and the processing component 902.

The memory 904 is configured to store various types of data to support the operation of the electronic device 900. Examples of such data include the instructions of any applications or methods operated on the electronic device 900, contact data, phone book data, messages, pictures, videos, etc. The memory 904 may be implemented by any type of volatile or non-volatile storage devices or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power supply component 906 may provide power for various components of the electronic device 900. The electrical component 906 may include a power supply management system, one or more power supplies, and other components related to generating, managing and distributing power for the device 900. The power supply component 906 may include a power supply chip, and the controller may communicate with the power supply chip, so that the power supply chip is controlled to turn on or off the switching device, so that the battery supplies or does not supply power to the main board circuit.

The multimedia component 908 includes a screen that provides an output interface screen provided between the electronic device 900 and the user. In some embodiments, a screen may include a liquid crystal display (LCD) and a touch panel (TP). When the screen includes a touch panel, the screen may be implemented as a touch screen to receive input signals from the user. The touch panel includes one or more touch sensors to sense touching, sliding and gestures on the touch panel. The touch sensor may not only sense the boundary of touching or sliding operation, but also detect the duration and pressure related to the touching or sliding operation.

The audio component 910 is configured as output and/or input signals. For example, the audio component 910 includes a microphone (MIC). When the electronic device 900 is in operation mode, such as a call mode, a recording mode, and a speech recognition mode, the microphone is configured to receive external audio signals. The audio signals received may be further stored in the memory 904 or sent via the communication component 916. In some embodiments, the audio component 910 further includes a speaker configured to output an audio signal.

The I/O interface 912 provides an interface for the processing component 902 and the peripheral interface module, and the peripheral interface module may be a keyboard, a click wheel, a button, etc.

The sensor component 914 includes one or more sensors, configured to provide various aspects of state evaluation for the electronic device 900. For example, the sensor component 914 may detect an on/off state of the electronic device 900 and the relative positioning of the component. For example, the component is a display and a keypad of the electronic device 900. The sensor component 914 may further detect a location change of the electronic device 900 or a component of the electronic device 900, a presence or absence of user contact with the device 900, an orientation or an acceleration/deceleration of the device 900, and a temperature change of the device 900. In this example, the sensor component 914 may include a magnetic sensor, a gyroscope, and a magnetic field sensor, where the magnetic field sensor includes at least one of the following: a Hall sensor, a thin film magneto-resistive sensor, and a magnetic liquid acceleration sensor.

The communication component 916 is configured for the convenience of wire or wireless communication between the electronic device 900 and other devices. The electronic device 900 may access wireless networks based on communication standard, such as WiFi, 2G, 3G, 4G or 5G, or their combination. In an example embodiment, the communication component 916 receives broadcast signals or broadcast-related information from an external broadcast management system via a broadcast channel. In an example embodiment, the communication component 916 further includes a near field communication (NFC) module to facilitate short-range communication. For example, the NFC module may be implemented based on a radio frequency identification (RFID) technology, an infrared data association (IRDA) technology, an ultra-wideband (UWB) technology, a bluetooth (BT) technology and other technologies.

In an example embodiment, the electronic device 300 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronics components, which is configured to perform the above method.

In an example embodiment, an electronic device is further provided. The electronic device includes a processor and a memory for storing computer programs executable by the processor. The processor is configured to execute the computer programs in the memory to implement the method according to the above embodiments.

The embodiment of the disclosure also provides a non-transitory computer readable storage medium has executable computer programs stored thereon. When the computer programs are executed by a processor, the processor is caused to implement the method according to the above embodiments. The readable storage medium may be a ROM, a random access memory (RAM), a CD-ROM, a magnetic tape, a floppy disk, an optical data storage device, etc.

After considering the specification and practicing the disclosure herein, those skilled in the art will easily think of other implementations. The present application is intended to cover any variations, usages, or adaptive changes of the present disclosure. These variations, usages, or adaptive changes follow the general principles of the present disclosure and include common knowledge or conventional technical means in the technical field not disclosed by the present disclosure. The description and the embodiments are to be regarded as exemplary only, and the true scope and spirit of the present disclosure are given by the appended claims.

It should be understood that the present disclosure is not limited to the precise structure described above and shown in the drawings, and various modifications and changes may be made without departing from its scope. The scope of the present application is only limited by the appended claims.

What is claimed is:

1. A touch module, comprising:
   a first switch,
   an integrating circuit,
   an analog-to-digital converter, and
   a compensation circuit,
   wherein the first switch is connected to the integrating circuit, the compensation circuit and the analog-to-digital converter, respectively, and
   the integrating circuit is connected to a touch detection line, configured to convert a current signal in each touch detection line at a touch position into a touch signal, in which the touch signal includes a noise signal;
   wherein the compensation circuit is configured to store the touch signal and compensate the noise signal in the touch signal to obtain a compensated signal; and
   wherein the analog-to-digital converter is configured to perform analog-to-digital conversion on the compensated signal to obtain touch data;
   wherein the compensation circuit comprises a second switch, a third switch, a storage capacitor, and a feedback module; wherein a first end of the second switch is connected to the integrating circuit, and a second end of the second switch is connected to a first end of the first switch, a first pole of the storage capacitor, and a first end of the third switch respectively; a second pole of the storage capacitor is grounded; the first end of the third switch is connected to the first pole of the storage capacitor, and a second end of the third switch is connected to a first end of the feedback module;
   when the second switch is on and the first switch and the third switch are off, the storage capacitor stores the touch signal;
   when the third switch is on and the first switch and the second switch are off, the storage capacitor stores the compensated signal; and
   when the first switch is on and the second switch and the third switch are off, the storage capacitor outputs the compensated signal.

2. The touch module of claim 1, wherein the feedback module is connected to multiple touch detection lines in a designated area; the multiple touch detection lines include at least one target touch detection line, in which the target touch detection line is determined based on pixel data of an image to be displayed; and
   the feedback module is configured to obtain a noise reference signal corresponding to at least one target touch detection line and determine a feedback current based on the noise reference signal, in which the feedback current is configured to filter out charge quantity corresponding to the noise signal in the storage capacitor.

3. The touch module of claim 2, wherein the feedback module is further configured to:
   when a number of target touch detection lines is 1, obtain an electrical signal on the target touch detection line, and determine the electrical signal as a noise reference signal corresponding to the target touch detection line.

4. The touch module of claim 3, wherein the electrical signal includes a voltage signal on the touch detection line outside the touch position and displaying the same image content.

5. The touch module of claim 2, wherein the feedback module is further configured to:
   when a number of target touch detection lines is more than 1, obtain an electrical signal on each target touch detection line, obtain an average value of the electrical signals of the target touch detection lines, and determine the average value as a noise reference signal corresponding to the target touch detection line.

6. The touch module of claim 2, wherein the feedback module is further configured to:
   obtain a correspondence between preset noise reference signals and feedback currents; and
   determine the feedback current corresponding to the noise reference signal based on the correspondence.

7. An electronic device, comprising:
   a display screen;
   a touch module, configured to obtain touch data based on an electrical signal on at least one target touch detection line; and
   a processor respectively connected to the display screen and the touch module, configured to determine the at least one target touch detection line based on an image to be displayed on the display screen, determine a touch position based on the touch data, and determine display content corresponding to the touch position;
   wherein the touch module is further configured to:

in response to detecting a scan signal, switch to a first working state and obtain a touch signal, in which the touch signal includes a noise signal;

in response to obtaining the touch signal, switch to a second working state, compensate the noise signal in the touch signal based on the electrical signal on at least one target touch detection line and obtain a compensated signal; and in response to obtaining the compensated signal, switch to a third working state and perform analog-to-digital conversion on the compensated signal to obtain the touch data;

wherein in response to compensating the noise signal in the touch signal based on the electrical signal on at least one target touch detection line, the touch module is further configured to:

obtain a noise reference signal corresponding to a target touch detection line based on the electrical signal on at least one target touch detection line;

obtain a feedback current corresponding to the noise reference signal based on a preset correspondence between noise reference signals and feedback currents; and compensate the noise signal in the touch signal based on the feedback current.

8. The electronic device of claim 7, wherein the electrical signal comprises a voltage signal on the touch detection line outside the touch position and displaying the same image content.

9. The electronic device of claim 7, wherein the processor is further configured to:

obtain the image to be displayed on the display screen, and a current touch detection line corresponding to a scan signal;

obtain a difference between pixel data corresponding to the current touch detection line and pixel data corresponding to touch detection lines other than the current touch detection line; and in response to the difference being less than or equal to a preset threshold, determine at least one target touch detection line that matches the current touch detection line.

10. The electronic device of claim 7, wherein the touch module is further configured to:

when a number of target touch detection lines is 1, obtain the electrical signal on the target touch detection line, and determine the electrical signal as the noise reference signal corresponding to the target touch detection line.

11. The electronic device of claim 7, wherein the touch module is further configured to:

when a number of target touch detection lines is more than 1, obtain an average value of the electrical signals of the target touch detection lines, and determine the average value as the noise reference signal corresponding to the target touch detection line.

12. A method for obtaining touch data, comprising:

in response to detecting a scan signal, switching to a first working state and obtaining a touch signal, in which the touch signal includes a noise signal;

in response to obtaining the touch signal, switching to a second working state, compensating the noise signal in the touch signal based on an electrical signal on at least one target touch detection line and obtaining a compensated signal; and in response to obtaining the compensated signal, switching to a third working state and performing analog-to-digital conversion on the compensated signal to obtain touch data;

wherein compensating the noise signal in the touch signal based on the electrical signal on at least one target touch detection line comprises:

obtaining a noise reference signal corresponding to a target touch detection line based on the electrical signal on at least one target touch detection line;

obtaining a feedback current corresponding to the noise reference signal based on a preset correspondence between noise reference signals and feedback currents; and compensating the noise signal in the touch signal based on the feedback current.

13. The method of claim 12, wherein obtaining the noise reference signal corresponding to the target touch detection line based on the electrical signal on at least one target touch detection line comprises:

when a number of target touch detection lines is 1, obtaining the electrical signal on the target touch detection line, and determining the electrical signal as the noise reference signal corresponding to the target touch detection line.

14. The method of claim 12, wherein obtaining the noise reference signal corresponding to the target touch detection line based on the electrical signal on at least one target touch detection line comprises:

when a number of target touch detection lines is more than 1, obtaining an average value of the electrical signals of the target touch detection lines, and determining the average value as the noise reference signal corresponding to the target touch detection line.

15. The method of claim 12, wherein the method further comprises obtaining at least one target touch detection line, which specifically comprises:

obtaining an image to be displayed on a display screen, and a current touch detection line corresponding to the scan signal;

obtaining a difference between pixel data corresponding to the current touch detection line and pixel data corresponding to touch detection lines other than the current touch detection line; and in response to the difference being less than or equal to a preset threshold, determining at least one target touch detection line that matches the current touch detection line.

16. The method of claim 15, wherein the electrical signal comprises a voltage signal on the touch detection line outside the touch position and displaying the same image content.

* * * * *